US010577820B2

(12) United States Patent
García Perez et al.

(10) Patent No.: US 10,577,820 B2
(45) Date of Patent: Mar. 3, 2020

(54) TOWER SECTION FOR AUTOMATICALLY RAISING A WIND TURBINE AND AUTOMATIC RAISING METHOD FOR SAME

(71) Applicant: NABRAWIND TECHNOLOGIES SL, Pamplona (ES)

(72) Inventors: Ana Cristina García Perez, Egües (ES); Ion Arocena De La Rúa, Pamplona (ES); Eneko Sanz Pascual, Pamplona (ES); Hely Ricardo Savii Costa, Uterga (ES)

(73) Assignee: NABRAWIND TECHNOLOGIES SL, Pamplona (ES)

( * ) Notice: Subject to any disclaimer, the term of this patent is extended or adjusted under 35 U.S.C. 154(b) by 0 days.

(21) Appl. No.: 16/199,829

(22) Filed: Nov. 26, 2018

(65) Prior Publication Data
US 2019/0093381 A1   Mar. 28, 2019

Related U.S. Application Data

(63) Continuation of application No. PCT/ES2016/000064, filed on May 27, 2016.

(51) Int. Cl.
*E04H 12/34*  (2006.01)
*E04H 12/10*  (2006.01)
*F03D 13/20*  (2016.01)
*F03D 1/00*   (2006.01)
*F03D 13/10*  (2016.01)

(52) U.S. Cl.
CPC .......... *E04H 12/344* (2013.01); *E04H 12/10* (2013.01); *E04H 12/34* (2013.01); *F03D 1/00* (2013.01);
(Continued)

(58) Field of Classification Search
CPC ....... E04H 12/344; E04H 12/10; E04H 12/34; F03D 13/10; F03D 13/20
See application file for complete search history.

(56) References Cited

U.S. PATENT DOCUMENTS

2006/0267348 A1* 11/2006 Weitkamp ............... E02D 27/42
290/55
2007/0240622 A1* 10/2007 Hu .......................... E04H 12/10
114/90
(Continued)

FOREIGN PATENT DOCUMENTS

CA   2880071 A1 *  1/2014  ............ E04H 12/08
CA   2924257 A1     3/2015
(Continued)

OTHER PUBLICATIONS

International Search Report in corresponding International Application No. PCT/ES2016/000064, date of completion Sep. 9, 2016.

*Primary Examiner* — Christine T Cajilig
(74) *Attorney, Agent, or Firm* — Edell Shapiro & Finnan, LLC

(57) ABSTRACT

The invention relates to a tower section and to a method for raising said section with a complete new or existing wind turbine on the upper part thereof, the assembly being raised to heights greater than 120 meters by means of a raising system that operates at ground level and gradually inserts modular frame structures through the lower part. The modules have heights between 10 and 14 meters and are formed by a trellis of at least three vertical columns and with diagonal elements which react to the twisting moments and shear forces generated by the action of the wind. A transition part with a base sufficient for raising in wind conditions greater than 15 meters/second is disposed on top of the modules. The raising method has several steps, for example: producing and installing a foundation; assembling the transition part on a connection element of a footing; mounting the wind turbine complete with the tubular tower, nacelle and rotor thereof; installing a lifting system and joining structures on a connection element of the footing; lifting a (Continued)

module N; assembling the different modules; and lastly assembling the final module and removing the automatic raising system.

19 Claims, 6 Drawing Sheets

(52) U.S. Cl.
CPC ............ *F03D 13/10* (2016.05); *F03D 13/20* (2016.05); *F05B 2230/61* (2013.01); *F05B 2240/915* (2013.01); *F05B 2240/916* (2013.01); *Y02E 10/726* (2013.01); *Y02E 10/728* (2013.01)

(56) References Cited

U.S. PATENT DOCUMENTS

| | | | | |
|---|---|---|---|---|
| 2014/0075864 A1* | 3/2014 | Foss | ............... | E02B 17/0004 52/223.4 |
| 2014/0083022 A1* | 3/2014 | Nummi | ............... | E04H 12/10 52/40 |
| 2014/0115987 A1* | 5/2014 | Rodriguez Tsouroukdissian | ........ | E02D 27/42 52/298 |
| 2014/0260076 A1 | 9/2014 | Yustus et al. | | |
| 2014/0331568 A1* | 11/2014 | Andersen | ............... | E04H 12/10 52/40 |
| 2015/0204101 A1* | 7/2015 | Zhao | ............... | E02B 17/0004 52/704 |
| 2017/0114777 A1 | 4/2017 | Sanz Pascual et al. | | |
| 2017/0321659 A1* | 11/2017 | V | ............... | F03D 13/20 |

FOREIGN PATENT DOCUMENTS

| | | | | |
|---|---|---|---|---|
| DE | 10111280 A1 * | 7/2002 | ............ | E04H 12/34 |
| EP | 2597227 A1 * | 5/2013 | ............ | E04H 12/10 |
| EP | 2759661 A1 | 7/2014 | | |
| ES | 2398834 A1 | 3/2013 | | |
| ES | 2526922 T3 | 1/2015 | | |
| WO | 2008064861 A2 | 6/2008 | | |
| WO | 2015150594 A1 | 10/2015 | | |

\* cited by examiner

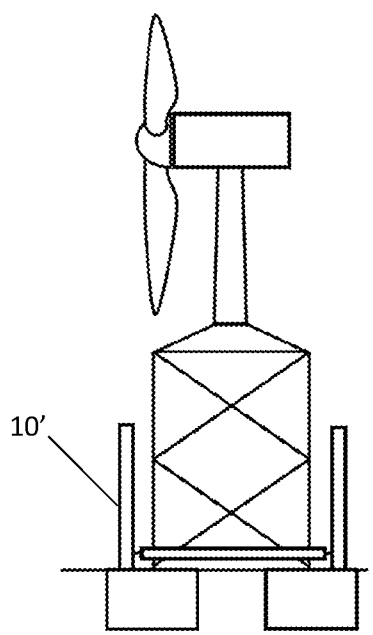
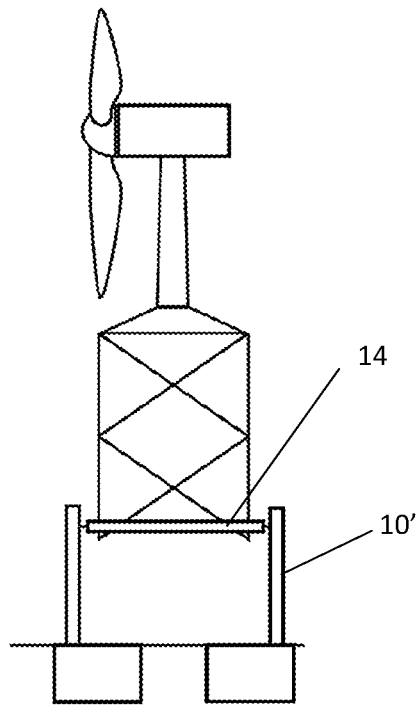
FIG.7A      FIG.7B
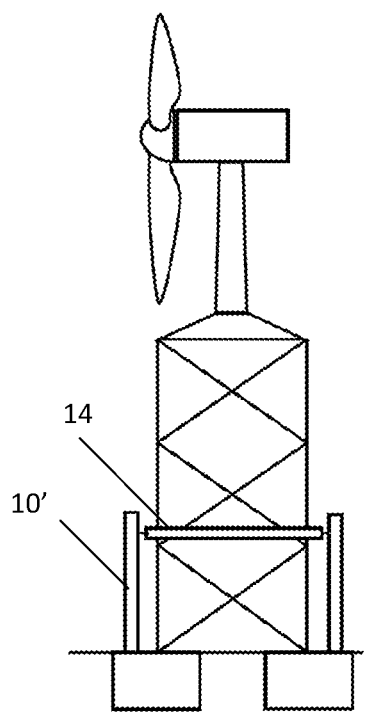
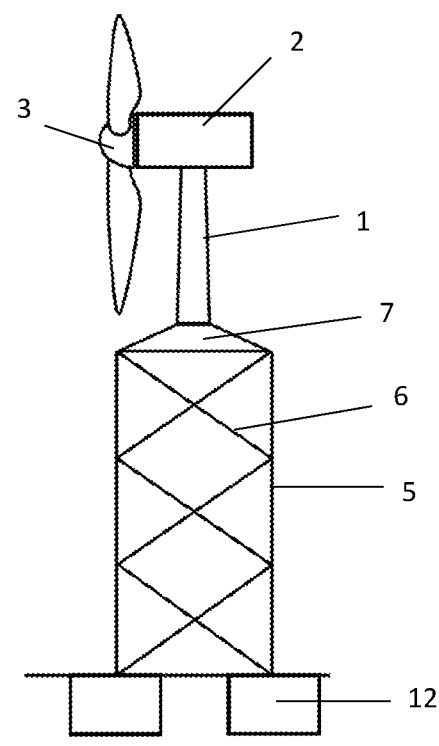
FIG.7C      FIG.7D

TOWER SECTION FOR AUTOMATICALLY RAISING A WIND TURBINE AND AUTOMATIC RAISING METHOD FOR SAME

CROSS-REFERENCE TO RELATED APPLICATIONS

This application relates to and claims the benefit and priority to International Application No. PCT/ES2016/000064, filed May 27, 2016.

FIELD

The invention is related to wind turbines, their automatic raising method and, in particular, the way in which, by means of a frame structured tower section, with its corresponding top transition piece and its footing, the raising is performed for a new wind turbine or for an already existing one using an already known external automatic raising system.

BACKGROUND

The search for locations with greater wind potential has led the best on-shore wind locations to become currently saturated. It is becoming more difficult to find areas with a high availability of unexploited wind energy.

The wind industry tends to exploit other on-shore locations with greater wind availability or to improve the already existing locations. To maximize the amount of energy produced at on-shore locations with less wind resource availability, or to improve already existing locations, the strategies adopted and those that set the market trends should be made by increasing the tower height. The wind speed increases with height due to friction against the ground, which leads to the wind shear profile. Since the energy produced changes with the cube of the wind speed, small increases in height allow for considerable increases in production.

To provide a solution to the problem of using areas with high winds but that are already occupied with other wind turbines, the possibility to replace the old turbines with new, taller turbines is proposed.

Along this line of using the already existing locations, and using the automatic raising system described in International Publication No. WO2015150594, a solution is presented for the raising of wind turbines that are operating in already existing locations, or for the raising of new wind turbines that require a greater height, which the conventional towers cannot satisfy.

The systems and methods disclosed herein facilitate the installation of 120 to 180 meter towers. Installing 120 to 180 meter towers using current installation systems and methods results in a significant increase in costs because the cranes to be used are very complex and scarce in the market. For towers over 120 meters, it is very difficult to locate an economically viable assembly system.

SUMMARY OF THE DISCLOSURE

The current invention involves the use of a lower tower section including modular frame structures and a transition piece atop the upper-most modular frame structure. The lower tower section is valid to raising an upper tower section with its nacelle and the complete rotor mounted on the top part of the tower. The upper tower section is typically tubular. This wind turbine may be one that is already existing and available at an on-shore location, together with other wind turbines, constituting what is denominated as a farm, or can be a new wind turbine that is wished to provide a greater height to take better advantage of the existing wind. In both cases, the same procedure will be followed throughout the lifting method.

The lower tower section is designed to be raised from the ground, without the need for cranes, and is comprised of a first part and a second part. The first part is a bottom part, comprising multiple modular straight frame structures, with a collapse angle of 0°. Each of the modular frame structures includes at least three 10 to 14 meter high vertical columns. The modular frame structures are transportable in conventional trucks. The second part is a transition piece located between a typically tapered upper tower section that supports the nacelle and rotor and the first part of the lower tower section comprising the modular frame structures. The modular frame structures of the lower tower section must be wide enough to allow for the necessary stability to be able to prevent the wind turbine from overturning when an incident wind acts against the nacelle and rotor during a raising of the modular frame structures when assembling the lower tower section.

According to one embodiment modular frame structures comprise two kinds of longitudinal elements joined together. A first kind of longitudinal elements are vertical columns, which support the main bending stresses on the tower from wind on the wind turbine rotor. A second kind of longitudinal elements are tightening elements (diagonal and horizontal) that react during moments of bending and shear stress generated by the wind.

The tightening elements are joined to the columns by means of plates welded with shear bolted joints. The tightening elements are joined together by means of shear bolted joints. The vertical columns are joined together by means of axial bolted joints, using circular flanges welded on each end. According to one embodiment the diagonal and horizontal tightening elements have a closed geometry, preferably cylindrical.

There are two preferable configurations of tightening elements. In a first configuration (K-joint), the tightening of each face of each module is made up of two horizontal and two diagonal tightening elements, which are joined at an equidistant point on the columns, at the height of the horizontal tightening elements. In a second configuration (X joint), the tightening of each side of each module is made up of four diagonal tightening elements, which are joined in the center of the face. To improve the sag stability of the diagonals, another three horizontal bars can be added that join the centers of each face.

According to one embodiment the foundation of the tower segment (that supports the loads transferred by the complete wind turbine) is made up of three independent footings of square or rectangular geometry, manufactured on-site or prefabricated. Each prefabricated footing can be longitudinally subdivided into a number of prefabricated elements, which are manufactured in a remote location and then transported separately, assembled and post-tensioned on-site, by means of post-tensioned cables that cross the horizontal holes in the pieces of the footing. The prefabricated footings (subdivided or not) can be pre-tensioned to improve their structural performance.

This automatic lifting system disclosed herein is already used in state of the art wind turbines described in International Publication No. WO2015150594 having the same applicant as that of the present application.

The lifting method may comprise the following phases:

Phase 1: Preparing the foundation.

Phase 2: Assembling the transition piece and fastening it to the foundation.

Phase 3: Assembling on the transition the upper tower section having attached thereto the nacelle and rotor of a wind turbine.

Phase 4: Installing the lifting system on the foundation.

Phase 5: Fastening the lifting system to the bottom part of the transition piece.

Phase 6: Unfastening the transitioning piece from the foundation.

Phase 7: Lifting the transition piece vertically above the foundation by use of the lifting system.

Phase 8: Placing a modular frame structure N under the transition piece.

Phase 9: Fastening the bottom part of the transition system to a top part of the modular frame structure N.

Phase 10: Unfastening the lifting system from the transition piece and fastening the lifting system to the modular frame structure N.

Phase 11: Lifting the modular frame structure N by use of the lifting system.

Phase 12: Placing a modular frame structure N+1 under the modular frame structure N.

Phase 13: Unfastening the lifting system from the modular frame structure N and fastening the lifting system to the modular frame structure N+1.

Phase 14: Repeating phases similar to phases 11-13 with the introduction of each subsequent modular frame structure.

Phase 15: Assembling the last modular frame structure into the lower tower section with the last modular frame structure being attached to the foundation.

Phase 16: Removing the lifting system from the foundation.

With the lifting system positioned on the foundation, the assembling is performed first by lifting the transition piece to which the upper tower section is attached by means of hydraulic actuators to insert a modular frame structure below transition piece. This advantageously allows the work to be performed on the ground. Thereafter, additional modular frame structures are sequentially positioned one on top of the other to form the lower tower section.

Another advantage is that the ground does not need to be conditioned since the installation of the lifting system with its joint structures is performed on the tower foundation footings. The main virtue of this technology is that its design was specifically created so that all the components of the wind turbine work during the assembly and when in operation. This way, by not needing additional reinforcements, the recurring cost of the wind turbine does not increase and the solution turns out to be extremely efficient. All the sections are transportable in conventional trucks, which is why the maximum expected length is 14 meters.

BRIEF DESCRIPTION OF THE DRAWINGS

Below is a very brief description of a series of drawings that helps to better understand the disclosure herein. These drawings serve as mere examples and are not to be construed as limiting the scope of the disclosure.

FIGS. 7A-7D shows a process by which additional modular frame structures are inserted into the lower tower during its construction.

DETAILED DESCRIPTION

Figure 1A:
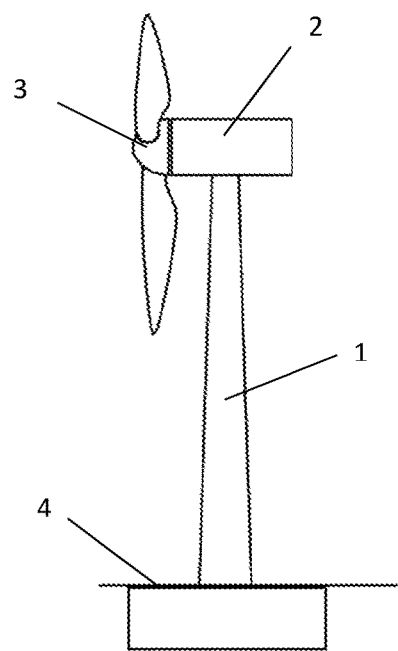
FIG. 1A is a side view of a conventional wind turbine.

FIG. 1A shows a side view of a conventional 3000 kw wind turbine that includes a tower sections 1, a nacelle 2 and a rotor with the blades already mounted. The tower section 1 may be made up of three or four cylindrical sections. The conventional wind turbine is lifted above the ground 4 a distance between 70 and 80 meters. The diameter of the rotor 3 with blades is typically about 120 meters. The base of the tower 1 typically has a maximum width of 4.5 meters.

Figure 1B:
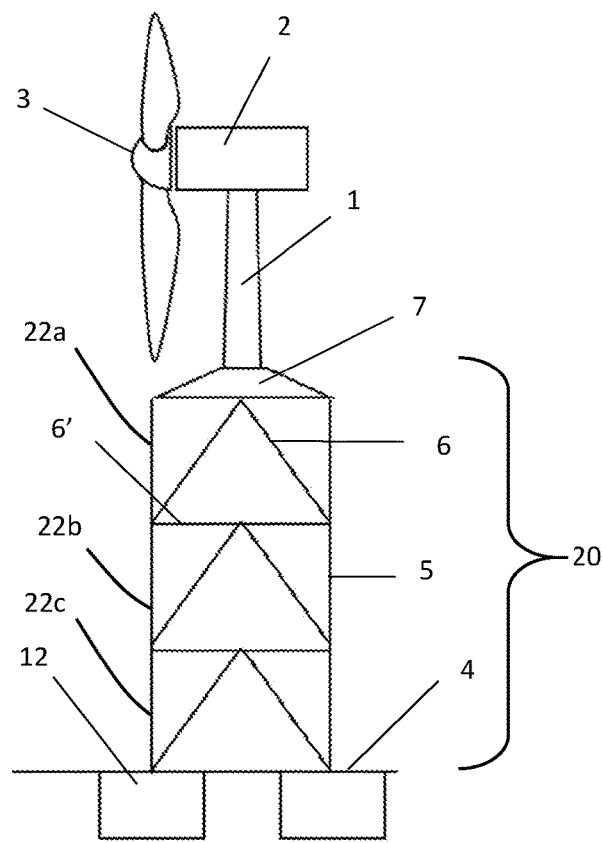
FIG. 1B is a side view of a wind turbine according to one implementation of the invention.

In FIG. 1B shows a taller wind turbine in which a conventional wind turbine is mounted to a lower tower section 20 that includes a transition piece 7 and a plurality of modular frame structures 22a, 22b and 22c. According to one embodiment each of the modular frame structures comprises at least three vertical columns 5, with diagonal elements 6 and horizontal elements 6' disposed between the vertical columns 5.

In the embodiment of FIG. 1B each of the modular frame structures is made up of two horizontal elements 6' and two diagonal elements 6 that are joined at an equidistant point from the vertical columns, at the height of the horizontal elements 6'.

In the embodiment of FIG. 7D each of the modular frame structures is made up of four or more diagonal elements 6 to improve the sag stability of the diagonal elements. Another three horizontal bars may be added that join the centers of each face.

Attached to the top part of the lower tower section 20 is the transition piece 7 located between the tapered section of the upper tubular tower section 1 and the upper-most modular frame structure 22a of the lower tower section. As shown in FIG. 1B, the entirety of the wind turbine apparatus rests on an independent foundation.

Figure 2A:
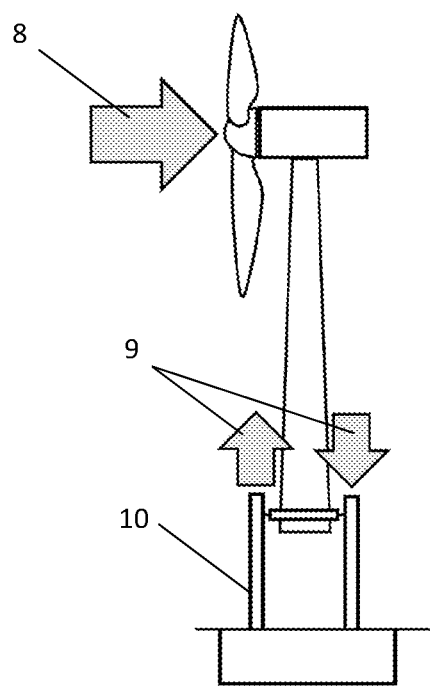
FIG. 2A shows the opposing forces induced on a conventional wind turbine during a lifting process due to incident wind acting on an upper part of the wind turbine.
Figure 2B:
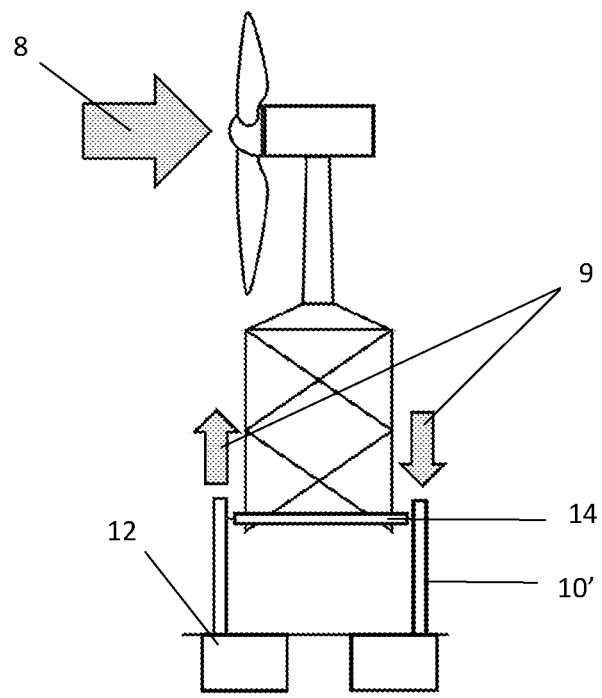
FIG. 2B shows the opposing forces induced on an embodiment of a wind turbine of the present invention during a lifting process due to incident wind acting on an upper part of the wind turbine.

For raising without external cranes the wind turbine of FIG. 1A which is pre-mounted with the nacelle, the rotor with blades and the upper tower section 1 at a height between 120 and 180 meters with respect to the ground 4, a technical problem must be resolved that occurs with the incident wind 8. At heights over 100 meters, the incident wind on the nacelle 2 and rotor 3 creates opposing forces 9 that cannot be supported by a lifting system 10 having a narrow base as shown in FIG. 2A. However, as shown in FIG. 2B, in wind turbines of the present invention the base of the lower tower section has a width of between 14 and 18 meters. This allows the distance between the actuators of the lifting system 10' to be greater, sufficient to endure the incident wind 8 acting on the wind turbine.

Figure 3:
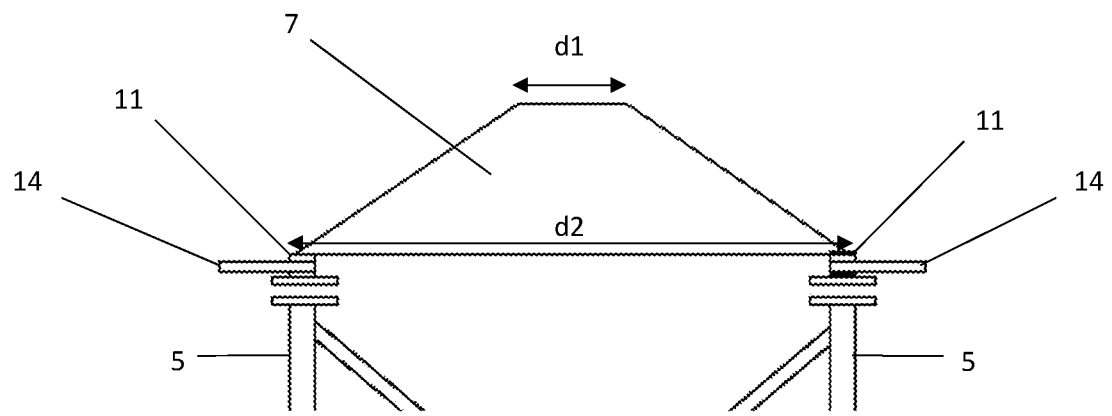
FIG. 3 shows a detail of a transition piece according to one embodiment.

To obtain enough distance between the vertical columns 5 of the modular frame structures, it is necessary to have a transition piece 7 as shown in FIG. 3. This open tapered piece goes from a top diameter (d1) of 3 to 4.5 meters to a bottom base with a diameter (d2) of 14 to 18 meters. The shape of the base of the transition piece 7 will depend on the number of columns 5 possessed by the modular frame structures. The modular frame structures 22a, 22b and 22c may have three, four or more vertical columns 5. The transition piece 7 has bottom interfaces 11 that connect to the lifting system 10'. These bottom interfaces 11 are responsible for the connection with the vertical columns 5 of the upper-most modular frame structure 22a. With this transition piece 7, it is possible to achieve raising with wind conditions greater than 15 meters/second.

The foundation 12 may be made up of at least three spaced-apart footings, which include connection elements 15 for attachment of the transition piece 7 and modular frame structures 22a, 22b and 22c to the foundation. Each of the foundation footings also includes a second connection element 16 to which the lifting system 10; is attached. Due to the configuration of the footings, the total volume of the foundation is much less than that of a conventional wind turbine foundation. This may allow for its prefabrication in a remote location and its transportation to the field, in one piece or several pieces that are connected together on-site. The footings may have a square or rectangular section and may be pre-tensioned.

Figure 4A:
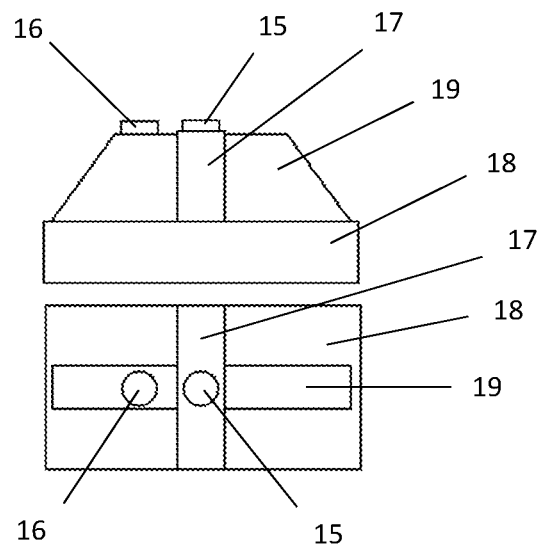
FIGS. 4A, 4B and 4C show top and side views of various embodiments of foundation footings.

FIG. 4A shows a constructed footing according to one embodiment. The footing may be constructed on-site or in at a remote location. The footing includes a central wall 17 on which the connection element 15 is located, the connection element 15 being configured for attachment to the vertical columns 5 of the modular frame structures 22a, 22b and 22c and to the bottom of the transition piece 7. The footing also includes a bottom slab 18, which distributes the load over the terrain, and at least one transversal wall 19 on each side of the wall, in which the connection element is integrated with the lifting system 10'.

Figure 4B:
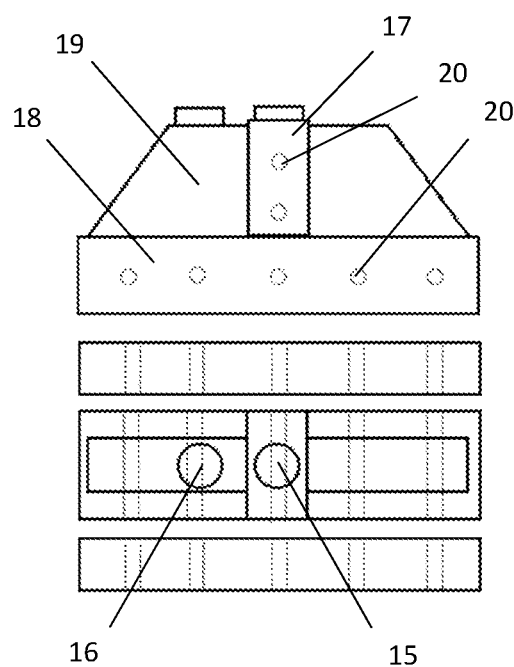
Figure 4C:
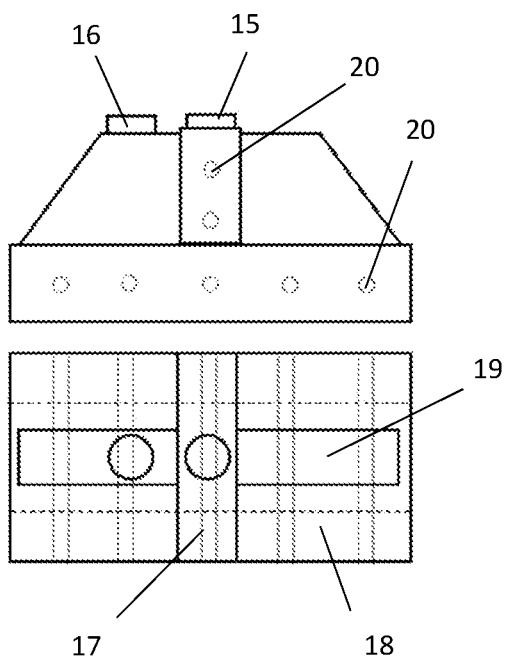

FIGS. 4B and 4C show the preferable subdivision for the alternative prefabricated foundation in different pieces (before and after the assembly), as well as the transverse holes 20 to position the tensing cables for the final post-tensioning process.

A lifting method according to one embodiment is shown among FIGS. 5, 6 and 7. According to one embodiment the lifting method comprises the following phases:

Phase 1: Preparing the foundation 12.

Phase 2: Assembling the transition piece 7 and fastening it to the foundation 12.

Phase 3: Assembling on the transition piece 7 the upper tower section having attached thereto the nacelle and rotor of a wind turbine.

Phase 4: Installing the lifting system 10' on the foundation 12.

Phase 5: Fastening the lifting system 10' to the bottom part of the transition piece 7.

Phase 6: Unfastening the transition piece 7 from the foundation.

Phase 7: Lifting the transition piece 7 vertically above the foundation 12 by use of the lifting system 10'.

Phase 8: Placing a modular frame structure 22a under the transition piece.

Phase 9: Fastening the bottom part of the transition system 7 to a top part of the modular frame structure 22a.

Phase 10: Unfastening the lifting system 10' from the transition piece and fastening the lifting system to the modular frame structure 22a.

Phase 11: Lifting the modular frame structure 22a by use of the lifting system 10'.

Phase 12: Placing modular frame structure 22b under the modular frame structure 22a.

Phase 13: Unfastening the lifting system 10' from the modular frame structure 22a and fastening the lifting system 10' to the modular frame structure 22a.

Phase 14: Repeating phases similar to phases 11-13 with the introduction of modular frame structure 22c and each subsequent modular frame structure.

Phase 15: Assembling the last modular frame structure into the lower tower section with the last modular frame structure being attached to the foundation.

Phase 16: Removing the lifting system from the foundation.

Figure 5A:
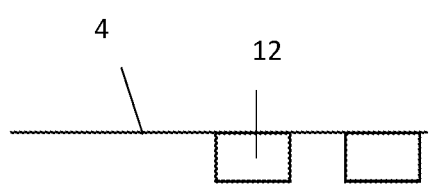
FIGS. 5A-5F show a process by which an upper tower section is constructed on a transition piece secured to footings of the foundation.

As shown in FIG. 5A, phase 1 is the preparation of the foundation 12. The first step is to establish the foundation 12 below ground level 4 and dimension it in accordance with the weights to be supported. The process starts with the excavation of as many independent foundation footings as there are vertical columns in the modular frame structures 22a, 22b and 22c. The prefabricated foundations 12 are then positioned for this alternative process. Lastly, the foundation 12 is covered with filler and the terrain is reconstructed.

Figure 5B:
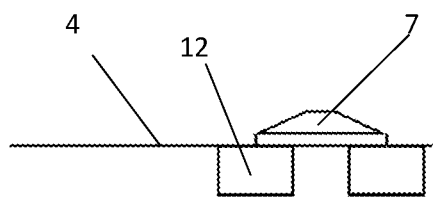

FIG. 5B shows the assembly of the transition piece 7 that makes up the top part of the second tower section 20. First, the bottom interfaces 11 of the transition piece 7 are installed on the connection elements 15. Thereafter the transition piece 7 is assembled on the work base made up of the aforementioned interfaces 11. (See FIG. 3).

Figure 5C:
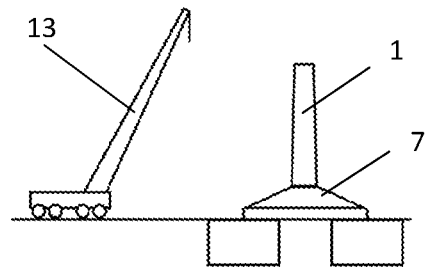
Figure 5D:
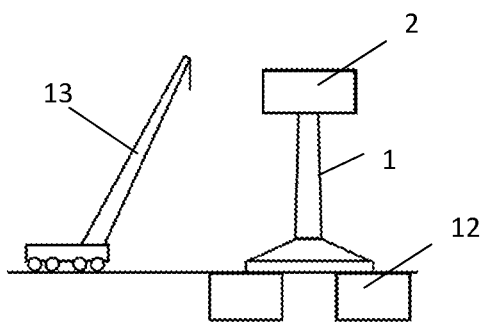
Figure 5E:
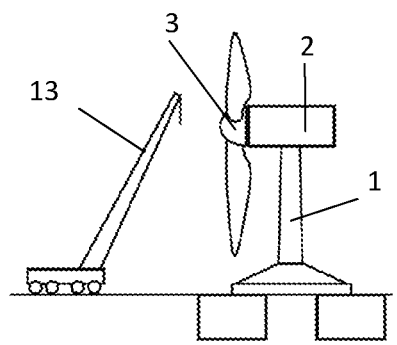
Figure 5F:
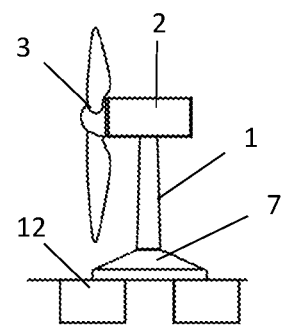

In FIGS. 5C, 5D and 5E the assembly process of the upper tubular tower section 1, nacelle 2 and rotor 3 of a wind turbine are shown. In this phase, the assembly process of the upper tubular tower section 1 is performed on the transition piece 7. After the upper tubular tower piece 1 is attached to the top part of the transition piece 7, the wind turbine nacelle 2 is assembled on a top flange of the upper tubular tower section 1. Lastly, the wind turbine rotor 3 is installed with its corresponding assembly blades. The entire assembly of the upper tower is performed using a conventional crane 13.

As shown in FIG. 6, once the upper portion of the wind turbine is mounted on the transition piece 7, the lifting system 10' is employed to vertically raise the transition piece 7 and subsequent modular frame structures 22a, 22b and 22c to provide a final turbine height that is greater than 100 meters. In FIG. 6A shows the installation of the lifting system 10'. Once the tower 1, nacelle 2 and complete rotor 3 are mounted on the transition piece, multiple lifting subassemblies (e.g. 10a, 10b) of the lifting system 10' are installed on the connection elements 16 of the footing. On each foundation 12 there will be installed as many lifting subassemblies as there are vertical columns in the modular frame structures. As shown in FIGS. 6A-F, a joint structure 14 extends between adjacent lifting subassemblies. During the assembling process the lifting subassemblies move between a bottom point and a top point to facilitate the insertion of the modular frame structures in a manner like that disclosed in International Application No. WO2015150594.

Figure 6A:
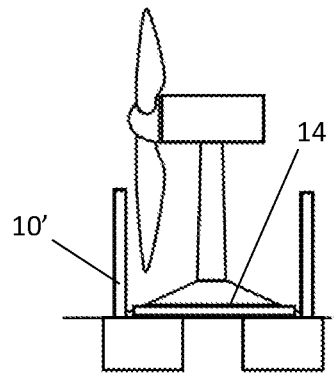
FIGS. 6A-6F show a process by which multiple modular frame structures are stacked one on top of the other in the formation of a lower tower section.
Figure 6B:
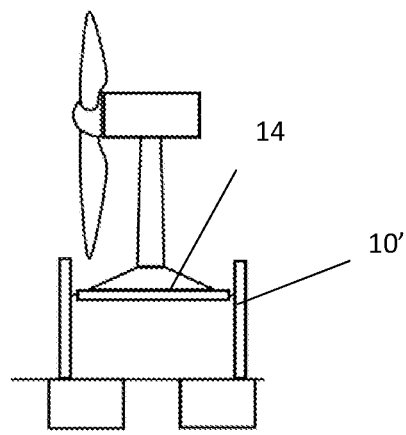
Figure 6C:
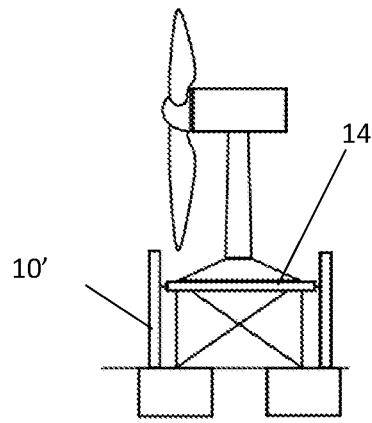
Figure 6D:
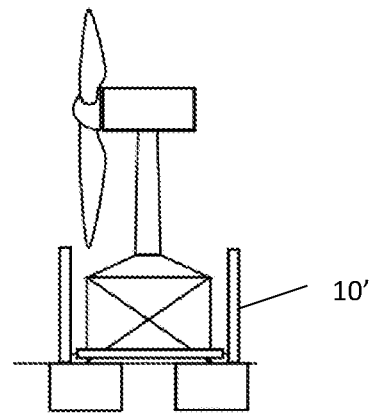
Figure 6E:
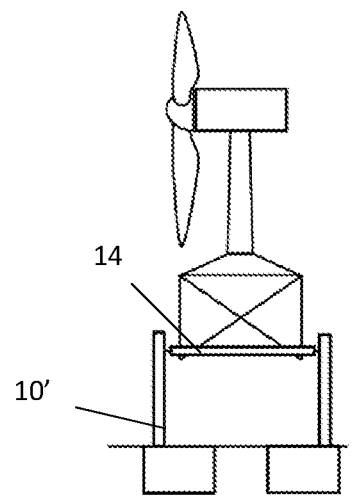
Figure 6F:
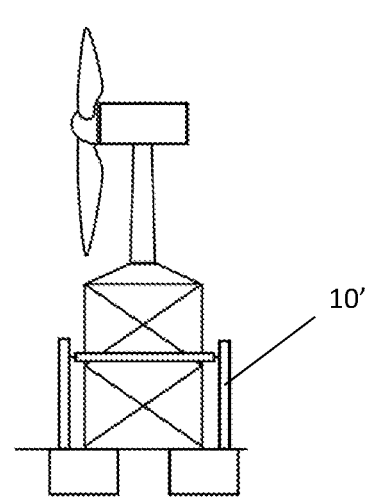

FIGS. 6C-F show the process of installing modular frame structures 22a and 22b. Once the transition piece 7 is lifted, modular frame structure 22a is inserted and subsequently attached to the lower part of the transition piece 7. Connection flanges that attach the lifting subassemblies to the transition piece 7 are subsequently released and the joint structures 14 extending between the lifting subassemblies are lowered. The insertion operation of modular frame structure 22b is subsequently performed as shown in FIG. 6F.

FIG. 7-D illustrates the process of inserting and assembling modular frame structure 22c into the lower tower section 20. Upon the last modular frame structure being installed and secured tot eh foundation 12, the lifting system 10' is removed as shown in FIG. 7D.

The following clauses disclose in an unlimited way additional implementations, with each clause representing an implementation.

Clause 1: A tower section for automatically raising a new or existing wind turbine, designed to be provided under its own wind turbine and by using an automatic raising system supported on independent foundations 12, lifting the entire assembly with the need of external cranes, characterized in that:
the tower section is a modular lattice, with 10 to 14 meter high modular sections, vertical columns 5 and a tightening system between columns 5, all transportable in conventional vehicles,
it has at least three vertical columns 5 on the closed gap section, 0° collapse, separated from each other by 14 to 18 meters, joined together by diagonal elements 6 and optionally by horizontal elements 6', both of the circular closed section gap,
it has a transition piece 7 that supports a conventional wind turbine on its top part, with a top diameter (d1) of 3 to 4.5 m and a bottom diameter (d2) of 14 to 18 m, as well as an interface 11 at its base with anchor systems to attach yourself to the column 5 and temporarily to the connection element 15 of the footing,
each of the modules that make up the tower section and transition piece 7 have external elements for anchoring to the auto-raising system, and
the entire assembly, with the tower section and complete wind turbine, can be automatic raising with an automatic raising system made up of a lifting system 10' having joint structures 14 and attached to a connection element 16 of the footing.

Clause 2: The tower section according to clause 1, wherein the foundation 12 is made up of as many square or rectangular footings as vertical columns 5 of the tower and has dimensions that allow for its prefabrication and transportation in conventional vehicles.

Clause 3: The tower section according to clause 2, wherein the footing is longitudinally subdivided into a number of prefabricated elements, which are manufactured in the plant view and then transported separately, assembled and post-tensioned on-site, by means of post-tensioned cables that cross the horizontal holes in the pieces of the footing.

Clause 4: The tower section according to clause 3 or clause 4, wherein the prefabricated pieces are pre-tensioned to improve their structural performance.

Clause 5: The tower section according to clause 1, wherein the tightening system of each face of each module is made up of two horizontal 6' and two diagonal 6 tightening elements, which are jointed at an equidistant point from the vertical columns 5, at the height of the horizontal tightening elements.

Clause 6: The tower section according to clause 1, wherein the tightening system of each face of each module is made up of four diagonal 6 tightening elements, which are jointed in the center of the face.

Clause 7: The tower section according to clause 6, wherein to improve the sag stability of the diagonals 6, another three horizontal bars are added that join the centers of each face.

Clause 8: The tower section according to claim 1, wherein all the elements are joined by bolted joints through the elements welded to the tubular profile gaps.

Clause 9: An automatic raising method of the tower section with a complete wind turbine on its top part, the method comprising:
Phase 1: Preparing the foundation 12 below ground level 4, providing as many independent foundations 12 as vertical columns 5, placing the prefabricated foundations 12, filler and reconditioning the terrain.
Phase 2: Assembling and fastening the transition piece 7 to the foundation 12 through the existing interfaces 11 on its base and the connection elements 15 of the footing.
Phase 3: Assembling a nacelle 2 and a rotor 3 of a wind turbine using a crane 13 on the transition 7 of the tubular tower 1.
Phase 4: Installing the automatic raising system on the foundation 12 that includes the assembly of the lifting system 10 with the joint structures 14 situated on the joint elements 16 of the footing.
Phase 5: Fastening the automatic raising system to the bottom part of the transition 7, removing the legs 11 from the foundation 12 and lifting the top assembly.
Phase 6: Assembling the N module under the assembly.
Phase 7: Unfastening the automatic raising and fastening to the bottom part of the N module.
Phase 8: Lifting the N module with the top assembly.
Phase 9: Repeating steps 5-8 on each module.
Phase 10: Assembling the last module and removing the lifting system from the foundation

What is claimed is:
1. A system for assembling a wind turbine comprising;
a nacelle, a rotor having blades and an upper tower section on which the nacelle and rotor are supported, the upper tower section having a base with a first width and a top on which the nacelle and rotor are supported, the top having a second width less than the first width;
at least first, second and third spaced-apart tower foundations configured to support the wind turbine after the assembling, each of the first, second and third tower foundations respectively having a first, second and third center connection;
a plurality of modular frame structures that are configured to be vertically joined together in a sequential manner to form a lower tower section, each of the plurality of modular frame structures including at least first, second and third vertical columns, each of the vertical columns comprising an upper end comprising a first flange and a lower end comprising a second flange, the plurality of modular frame structures configured to be attached to one another by a coupling together of the first and second flanges, the second flanges being configured to be respectively attached to the first, second and third center connection of the respective first, second and third tower foundations, the plurality of modular frame structures comprising an upper-most frame structure after the assembling;

a transition piece configured to couple the upper tower section to the lower tower section, the transitional piece including an upper part that is configured to be coupled to the base of the upper tower and a lower part comprising a plurality of flanges that are configured to be coupled to the first flanges of the upper-most modular frame structure and also to the first, second and third connections of the first, second and third tower foundations, the upper part of the transition piece having a first width and the lower part of the transition piece having a second width greater than the first width; and a lifting system including at least first, second and third lifting subassemblies that are respectively supported on the ground, the first, second and third lifting subassemblies having disposed between them first, second and third joint structures that each moves vertically upward and downward between upper and lower points, the first, second and third joint structures configured to be respectively attached to the first, second and third columns of the plurality of modular frame structures.

2. The system according to claim 1, wherein the upper tower section is tubular.

3. The system according to claim 1, wherein the vertical columns have a length of between 10 to 14 meters.

4. The system according to claim 1, wherein the lower part of the transition piece has a width that is 3 to 6 times greater than the width of the upper part of the transition piece.

5. The system according to claim 1, wherein the lower part of the transition piece has a width of 14 to 18 meters and the upper part of the transition piece has a width of 3 to 4.5 meters.

6. The system according to claim 3, wherein the vertical columns are separated by a distance of 14 to 18 meters.

7. The system according to claim 1, wherein each of the modular frame structures comprises diagonal tensioning elements attached to and extending between vertical columns within each of the modular frame structures.

8. The system according to claim 1, wherein each of the frame structures comprises horizontal members that extend between adjacent vertical columns, the horizontal elements being arranged perpendicular to the vertical columns and having a length between 14 to 18 meters.

9. The system according to claim 1, wherein each of the modular frame structures has a same width dimension.

10. The system according to claim 1, wherein the transition piece has a height that is less than a height of each of the modular frame structures.

11. The system according to claim 1, wherein a combined height of the assembled upper tower section, nacelle and rotor is between 70 to 80 meters.

12. The system according to claim 10, wherein an overall height of the wind turbine after assembling is between 120 to 180 meters as measured from a top of the first, second and third foundations subassemblies.

13. The system according to claim 1, wherein each of the modular frame structures comprises multiple faces bounded on each side by a vertical column, the modular frame structures further including a tightening system disposed in one or more of the faces, the tightening system including two horizontal elements and two diagonal elements that are joined to the vertical columns bounding the faces.

14. A method for assembling a wind turbine, the method comprising:
attaching a transition piece to a foundation, the transition piece having a top part having a first width and a bottom part having a second width that is greater than the first width;
assembling on the upper part of the transition piece an upper tower section, the upper tower section having a base and a top part opposite the base;
coupling to the top part of the upper tower section a nacelle and a rotor;
installing a lifting system on the ground;
fastening the bottom part of the transition piece to the lifting system;
detaching the transition piece from the foundation;
lifting the transition piece above the foundation by use of the lifting system;
placing a first modular frame structure under the transition piece and attaching the first modular frame structure to the foundation;
fastening the bottom part of the transition system to a top part of the first modular frame structure;
detaching the transition piece from the lifting system and fastening the lifting system to the first modular frame structure;
detaching the first modular frame structure from the foundation and lifting the first modular frame structure by use of the lifting system;
placing a second modular frame structure under the first modular frame structure and attaching the second modular frame structure to the foundation; and
attaching a top part of the second modular frame structure to a bottom part of the first modular frame structure.

15. The method according to claim 14, further comprising:
detaching the second modular frame structure from the foundation and lifting the second modular frame structure by use of the lifting system;
placing a third modular frame structure under the second modular frame structure and attaching the third modular frame structure to the foundation; and
attaching a top part of the third modular frame structure to a bottom part of the second modular frame structure.

16. The method according to claim 14, wherein the second width of the transition piece is 3 to 6 times greater than the first width.

17. The method according to claim 14, wherein the second width of the transition piece has a width of 14 to 18 meters and the first width of the transition piece has a width of 3 to 4.5 meters.

18. The system according to claim 14, wherein the upper tower section is tubular.

19. The system according to claim 14, wherein the first, second and third vertical columns each have a length of 10 to 14 meters and are separated by a distance of 14 to 18 meters.

* * * * *